United States Patent [19]

Post

[11] Patent Number: 4,579,205
[45] Date of Patent: Apr. 1, 1986

[54] PROTECTIVE CLUTCH ASSEMBLY WITH MECHANICALLY ACTUATED CONTROL RING

[75] Inventor: Alexander Post, Neunkirchen-S, Fed. Rep. of Germany

[73] Assignee: Jean Walterscheid GmbH, Lohmar/Rhld, Fed. Rep. of Germany

[21] Appl. No.: 656,772

[22] Filed: Oct. 1, 1984

[30] Foreign Application Priority Data

Oct. 7, 1983 [DE] Fed. Rep. of Germany ....... 3336482

[51] Int. Cl.⁴ ............... F16D 11/10; F16D 15/00; F16D 43/00
[52] U.S. Cl. ............... 192/24; 192/56 R; 192/82 T; 192/103 R; 192/114 R
[58] Field of Search ............... 192/24, 38, 114 R, 23, 192/101, 82 T, 103 R, 90, 91 R, 56 R

[56] References Cited

U.S. PATENT DOCUMENTS

| | | | |
|---|---|---|---|
| 3,682,506 | 8/1972 | Bruyere et al. | 192/114 R X |
| 4,126,098 | 11/1978 | Coulombe | 192/24 X |
| 4,294,340 | 10/1981 | Kunze | 192/56 R |
| 4,396,102 | 8/1983 | Beach | 192/114 R X |
| 4,460,077 | 7/1984 | Geisthoff | 192/24 X |
| 4,538,715 | 9/1985 | Konrad et al. | 192/114 R X |

Primary Examiner—Rodney H. Bonck
Attorney, Agent, or Firm—Toren, McGeady, Stanger, Goldberg & Keil

[57] ABSTRACT

A protective clutch wherein a switching ring having an inner bore in the shape of a frustum is axially actuated to control a radially extending actuating pin which operates to place a control ring into and out of rotative engagement with one of a driven and driving member of the clutch. The control ring contains recesses within which torque transmitting balls of the clutch may move when the control ring is in angular alignment therewith to disengage the clutch with angular unalignment of the control ring operating to bring the torque transmitting balls back into torque transmitting position.

4 Claims, 2 Drawing Figures

PROTECTIVE CLUTCH ASSEMBLY WITH MECHANICALLY ACTUATED CONTROL RING

The present invention relates generally to clutch mechanisms and more specifically to a protective clutch for drive lines, particularly for the drive shafts connecting an agricultural implement to the power takeoff shaft of a tractor.

Clutch devices of the type to which the present invention relates generally consist of a driven and a driving clutch member, in the case of which the one clutch part designed as a clutch hub, for example, is provided with circumferentially spaced apertures holding therein rolling members or balls which act as the torque transmission members of the clutch. When the clutch is to be engaged to transmit torque, the torque transmission members engage into recesses of the other clutch part and a control ring is provided which is held in a torque transmitting position by springs acting in a circumferential direction, the control ring being supported on the clutch hub so as to be rotatable, but prevented from axial movement.

A torque limiting clutch known in the prior art involves a construction wherein the clutch part designed as the clutch hub comprises, for example, circumferentially spaced apertures holding the torque transmitting members therein with a switching disc being held in a torque transmitting position by springs acting in the circumferential direction.

The torque transmitting clutch described has the disadvantage that it can monitor only those torques which occur in the drive line into which it is incorporated. Any external signals cannot be processed by such a torque limiting clutch.

The present invention is directed toward providing a protective or switching clutch mechanism which is capable of reacting to any parameters corresponding to existing requirements.

SUMMARY OF THE INVENTION

Briefly, the present invention may be described as a protective clutch assembly particularly suitable for use in the drive lines between an agricultural implement and the power takeoff shaft of a tractor comprising: a driving member and a driven member; torque transmission members interposed in torque transmitting engagement between said driving and driven members, said torque transmission members being held on one of said driving and driven members and being adapted to be engaged with and disengaged from the other of said members for engaging and disengaging said clutch; a control ring angularly movable to bring said torque transmission members into and out of torque transmitting positions; first spring means urging said control ring to a position holding said torque transmitting members in the torque transmitting position; a radially extending through-bore formed in said control ring; a blind hole formed in said one member adapted to be aligned with said through-bore when said clutch is engaged; a first pin in said blind hole adapted to extend outwardly therefrom into said through-bore for placing said one member in rotative engagement with said control ring; second spring means biasing said first pin outwardly of said blind hole into engagement with said control ring within said through-bore; an actuating pin within said through-bore having a length extending radially outwardly thereof; a nonrotatable switching ring having an inner bore with the shape of a frustum which is movable in the axial direction of said clutch assembly for engagement with said actuating pin; and an actuating mechanism for driving said switching ring into and out of engagement with said actuating pin; said switching ring operating to bring said actuating pin into and out of abutting engagement with said first pin to effect rotative disengagement and engagement of said control ring with said one member thereby to enable angular movement of said control ring to bring said torque transmission members into and out of torque transmitting position.

Thus, in the operation of the mechanism in accordance with the present invention, when the switching ring is moved into engagement with the actuating pin, the actuating pin is moved radially inwardly against the first pin so as to move the first pin against the biasing force of the second spring means thereby enabling the first pin to release the rotative engagement between the control ring and the one member whereby the control ring may move angularly or rotatively relative to said one member so that the torque transmission members may enter recesses formed in the control ring thereby to disengage the clutch.

When the switching ring is removed from engagement with the actuating pin, the second spring means moves the first pin back into a position where it may become engaged within the through-bore of the control ring as the control ring moves angularly to bring the through-bore and the blind hole into alignment.

The nonrotatable switching ring is movable in the direction of the clutch axis and is provided with the bore in the form of a frustum and the switching ring with its frustum-shaped bore is movable across the projecting part of the actuating pin so as to effect movement of the pin by engagement thereof with the frustum-shaped bore.

The advantage of the switching clutch in accordance with the present invention is that for changing the clutch from the torque transmitting position into the freewheeling position, a relatively small switching force is required as apart from the flywheel effect of the control disc, only the force of the relatively weak spring acting in the circumferential direction needs to be overcome.

There is an additional advantage in that the clutch is switched in automatically by means of the circumferentially acting first spring means and that due to the rolling movement of the driving members during the switching process there is little wear.

In a preferred embodiment of the invention, the lifting or actuating mechanism which drives the switching ring may be formed as a lifting or driving magnet. By utilizing the electrical system of the tractor, the switching process is thus made easy to initiate by means of the lifting or actuating magnet.

In accordance with a further embodiment of the invention, the lifting or actuating mechanism may be designed as a hydraulic tappet. In this embodiment, the switching process can be effected by the existing hydraulic system of the tractor.

In accordance with a further advantageous feature of the invention, the frustum-shaped bore of the switching ring is lined with a frictional annular member. The advantage of this is that in the case of wear the friction ring may be easily replaced.

The various features of novelty which characterize the invention are pointed out with particularity in the claims annexed to and forming a part of this disclosure.

For a better understanding of the invention, its operating advantages and specific objects attained by its use, reference should be had to the drawings and descriptive matter in which there are illustrated and described preferred embodiments of the invention.

DETAILED DESCRIPTION OF THE PREFERRED EMBODIMENTS

Figure 1:
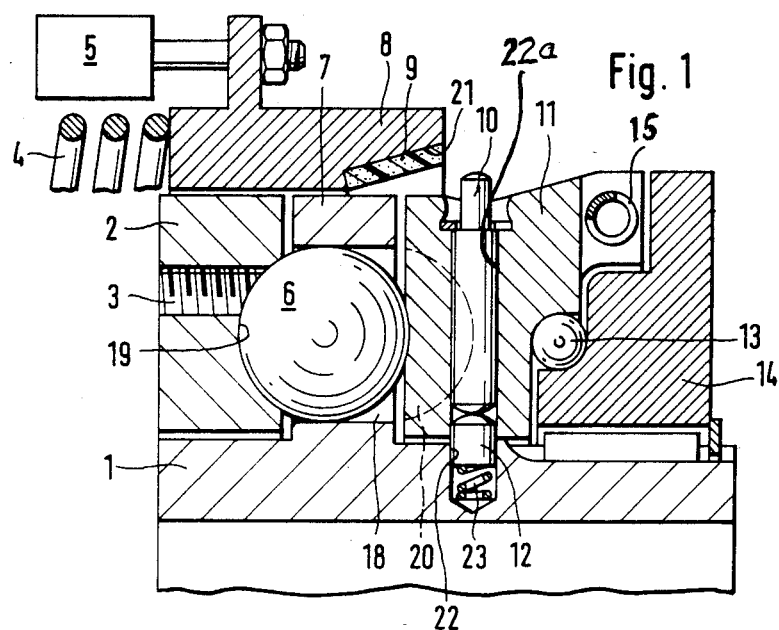
FIG. 1 is a sectional view showing the protective clutch assembly in accordance with the present invention.
Figure 2:
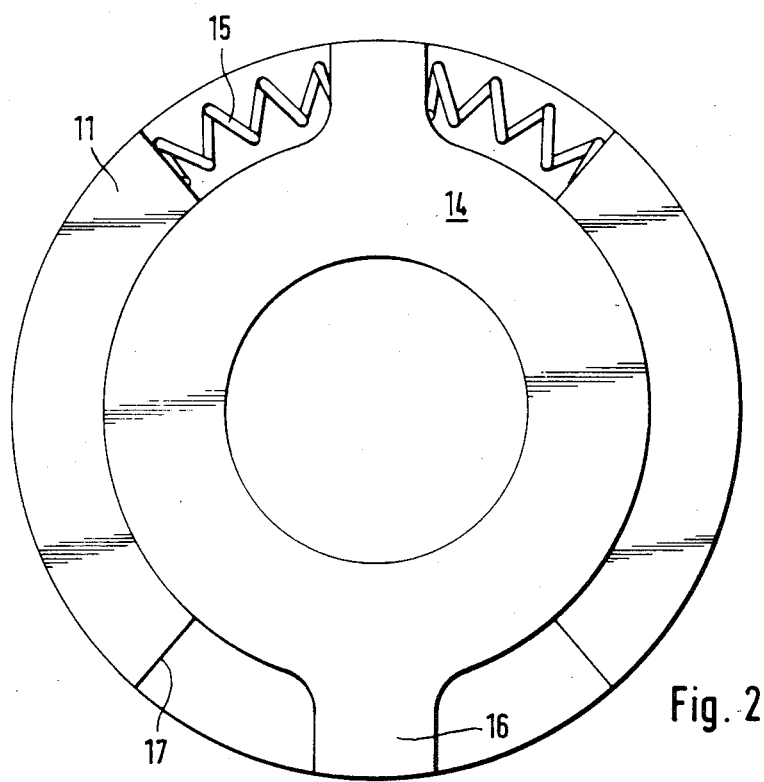
FIG. 2 is a plan view of the clutch assembly showing the circumferentially acting springs and the limiting stops for the control ring.

Referring now to the drawing wherein there is shown a protective switching clutch in accordance with the invention, the clutch assembly is illustrated in FIG. 1 as consisting essentially of a clutch hub 1 provided with a flange or extension 7 wherein there are held driving members 6 arranged uniformly circumferentially distributed within apertures 18. The driving member 6 comprise spherical balls which act as the torque transmission members of the device.

When in the torque transmitting position, the driving members 6 engage into recesses 19 of a driving ring 2 so that the clutch hub 1 and the driving ring 2 are coupled to be placed in torque transmitting engagement. At the end away from the driving ring 2, the driving members 6 are supported on a control ring 11.

The control ring 11 is firmly connected to the clutch hub 1 by means of a first pin 12 which constitutes an interconnecting pin or driving bolt which is loaded radially outwardly by a spring 23 located within a blind hole 22. The control ring 11 is provided with further recesses 20 which, when the clutch is in the torque transmitting condition, are held so as to be angularly offset relative to the recesses 19 of the driving ring 2.

Between a supporting ring 14 and the control ring 11, provision is made for circumferentially acting springs 15 which operate to hold the control ring 11 in the torque transmitting position of the clutch.

The control ring 11 is provided with a radially extending through-bore 22a within which there is guided an actuating pin 10. The pin 10 is formed with a projecting portion which extends radially beyond or outwardly of the control ring 11.

A switching ring 8 arranged around the clutch assembly is held in a nonrotative but axially movable condition. At the end of the switching ring 8 facing toward the control ring 11, there is provided a bore 21 having the shape of a frustum. In a preferred embodiment of the invention, the bore 21 is provided with an annular member 9 formed of friction material.

The switching ring 8 is loaded or biased by the force of a spring 4 in such a manner that, in the normal position, the frustum-shaped bore 21 will engage the actuating pin 10 and move the pin 10 inwardly to such an extent that the driving pin or bolt 12 will be pressed out of the through-bore 22a of the control ring 11. At the same time, as a result of the friction locking engagement between the bore 21 of the switching ring 8 and the actuating pin 10, the control ring 11 will have a braking force applied thereto and is turned in such a way that the angular positions of the recesses 20 of the control ring 11 and of the driving members 6 will correspond.

As a result, the driving members 6 may now emerge from the recesses 19 in the driving ring 2 and move into the recesses 20 of the control ring 11. As a result, the driving members 6 are moved out of the torque transmitting position and the clutch is disengaged.

The control ring 11 is provided with stops 17 which, when the control ring 11 is turned, engage against a stop nose 16 at the supporting ring 14 so as to prevent excessive rotation of the control ring 11.

In order to place the clutch assembly into the torque transmitting position, there is provided an actuating or lifting mechanism 5 which operates to move the switching ring 8. With the clutch in the disengaged position, the switching ring 8 is pulled away from the actuating pin 10 in order to enable the driving pin 12 to engage within the through-bore 22a of the control ring 11 thereby placing the clutch hub 1 and the control ring 11 in rotative engagement with each other. As a result, the recesses 20 will move angularly away from the torque transmission members 6 and the control ring 11 will operate to move the transmission members 6 back into engagement within the recesses 19 thereby reengaging the clutch.

When the switching signal for engaging the clutch which is produced in the mechanism 5 is released, the spring 4 will be in a position to cause the switching ring 8 to engage again onto the actuating pin 10 so that the surface of the friction material 9 will press against the protruding end of the pin 10 thereby pressing the pin 10 inwardly of the through-bore 22a in order to drive the pin 12 against the force of the spring 23 into the blind hole 22. As a result, the control ring 11 will be braked and the resulting rotation thereof will cause the clutch to again be moved into the freewheeling position.

Bearings 13 are provided between the supporting ring 14 and the control ring 11.

The switching or lifting mechanism 5 may be designed as a lifting magnet or, alternatively, it may be designed as a hydraulic tappet. In the case of the lifting magnet, the mechanism 5 may be actuated by utilizing the electrical system of the tractor. If a hydraulic tappet is provided for the mechanism 5, then the switching process can be carried out by the existing hydraulic system of the tractor.

Thus, it will be seen that the present invention provides a switching or protective clutch assembly which may be released by different parameters (temperature, torque, speed, etc.).

In accordance with the invention, the objectives thereof are achieved in that, in the torque transmitting position, a driving ring is connected to the clutch hub by means of driving members which are designed as balls and that the freewheeling position is reached through turning a control ring by braking the control ring by means of a switching ring.

While specific embodiments of the invention have been shown and described in detail to illustrate the application of the inventive principles, it will be understood that the invention may be embodied otherwise without departing from such principles.

What is claimed is:

1. A protective clutch particularly for the drive line between an agricultural implement and the power take-off shaft of a tractor comprising:
   a driving member and a driven member;
   torque transmission members interposed for torque transmitting engagement between said driving and driven members, said torque transmission members being held on one of said driving and driven members and being adapted to be engaged with and disengaged from the other of said driving and driven members in order to effect engagement and disengagement of said clutch;

a control ring angularly movable to bring said torque transmission members into and out of torque transmitting position between said driving and driven members;

first spring means urging said control ring to a position holding said torque transmission members in the torque transmitting position;

a radially extending through-bore formed in said control ring;

a blind hole formed in said one member adapted to be angularly aligned with said through-bore;

a first pin in said blind hole adapted to extend outwardly therefrom into said through-bore for placing said one member in rotative engagement with said control ring when said blind hole and said through-bore are aligned;

second spring means biasing said first pin outwardly of said blind hole toward engagement with said control ring within said through-bore;

an actuating pin within said through-bore having a length extending radially outwardly thereof;

a nonrotatable switching ring having an inner bore with the shape of a frustum which is movable in the axial direction of said clutch for engagement with said actuating pin; and an actuating mechanism for driving said switching ring into and out of engagement with said actuating pin;

said switching ring operating to bring said actuating pin into and out of abutting engagement with said first pin to effect rotative disengagement and engagement of said control ring with said one member thereby to enable angular movement of said control ring to bring said torque transmitting members into and out of torque transmitting position.

2. A clutch according to claim 1, wherein said actuating mechanism comprises magnetic actuating means.

3. A clutch according to claim 1, wherein said actuating mechanism comprises hydraulic actuating means.

4. A clutch according to claim 1, wherein said frustum-shaped bore of said switching ring is lined with a friction material.

* * * * *